FREQUENCY DECODING SYSTEM
Filed April 27, 1964
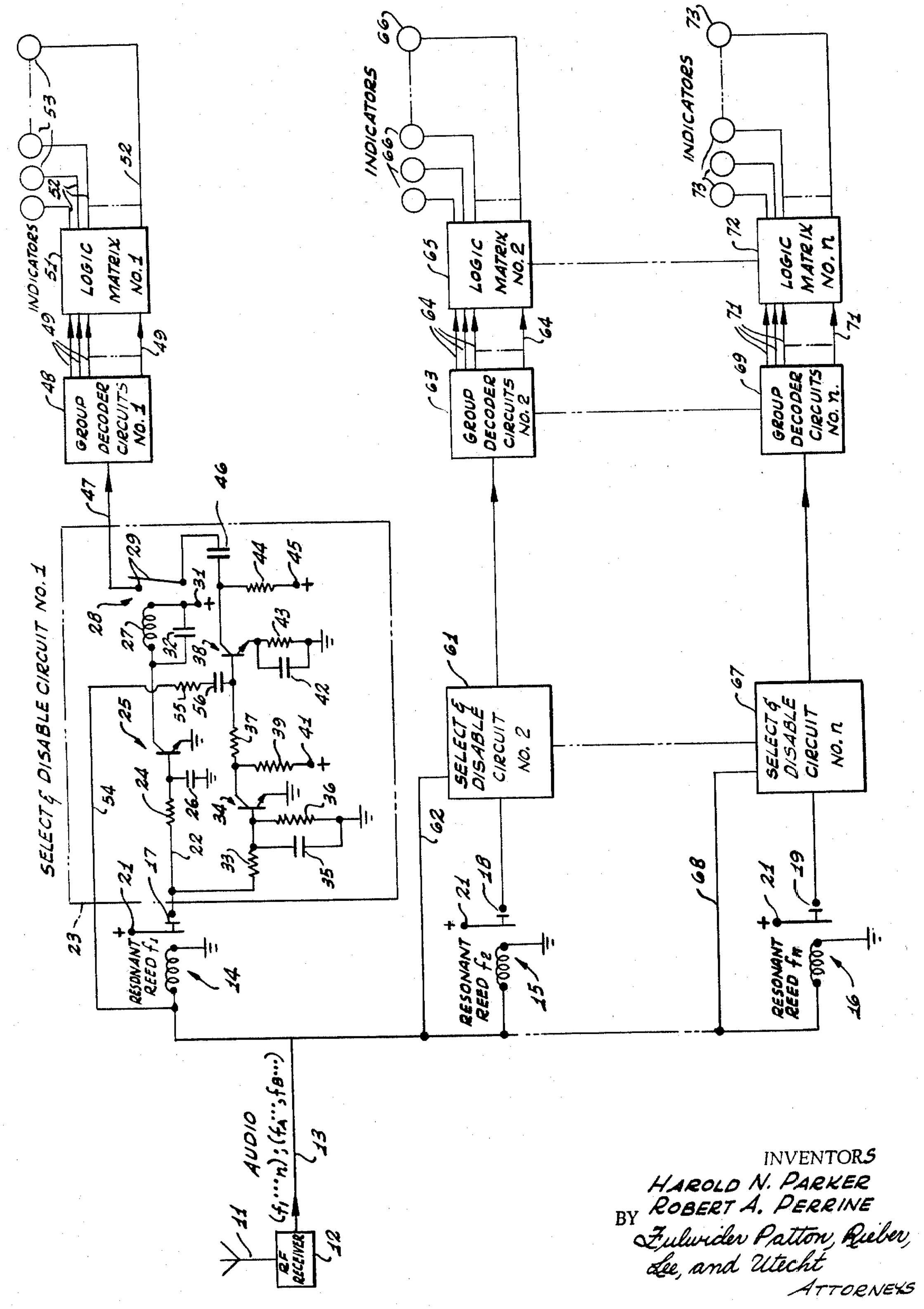
INVENTORS
HAROLD N. PARKER
ROBERT A. PERRINE
BY Fulwider, Patton, Rieber, Lee, and Utecht
ATTORNEYS United States Patent Office 3,395,390

Patented July 30, 1968

3,395,390

FREQUENCY DECODING SYSTEM

Harold N. Parker, North Hollywood, and Robert A. Perrine, Los Angeles, Calif., assignors to Well Sentry Inc., Los Angeles, Calif., a corporation of California Filed Apr. 27, 1964, Ser. No. 362,756

12 Claims. (Cl. 340—171)

ABSTRACT OF THE DISCLOSURE

A system for decoding frequency coded intelligence employing decoding circuits operating on a multi-frequency code in which a first, accurately controlled frequency is detected by highly selective decoding means and a plurality of less accurately controlled coding frequencies are passed through wider band decoding circuits to identify the intelligence transmitted. The wider band decoding circuits feed to logic matrices and thence to indicators or the like to identify the transmitted intelligence. The system includes means preventing passage of the accurately controlled frequency into the wider band decoding circuits. Transmission of the wider band coding frequencies is blocked while the accurately controlled frequency is present and the coding frequency are passed to the decoding circuits for a predetermined time interval after termination of the accurately controlled frequency.

In the transmission of intelligence, information may be coded by combinations of frequencies in the audio range. These frequencies may be transmitted simultaneously or consecutively or in combinations thereof, and may be transmitted by means of radio frequency carrier waves modulated by the audio frequency code. Where the coding frequencies are all accurately controlled and are detected by highly selective circuits, the cost of the system becomes relatively high and it is a primary object of the present invention to provide frequency decoding circuits which will permit the accurate transmission of intelligence using a single, accurately controlled and highly selectively detected frequency combined with less accurately controlled coding frequencies detected by wider band selective circuits, to reduce the cost of the frequency coding and decoding system for information transmission.

Another object of this invention is the provision of an improved frequency decoding system of low cost though accurate and reliable.

A further object of this invention is the provision of improved frequency decoding circuits employing a highly selective first frequency responsive circuit and wider band less selective circuits for other frequency response, and having means for preventing passage of the first frequency into said wider band circuits.

A still further object of this invention is the provision of improved frequency decoding circuits including a plurality of groups of relatively wide band selective circuits detecting relatively less accurately controlled coding frequencies and a plurality of highly selective circuits detecting relatively accurately controlled frequencies to uniquely select the group of wide band circuits to which the less accurate frequencies are transmitted for decoding, including means for preventing the passage of the accurately controlled frequency to the wide band group.

These and other objects and features of the invention will be apparent to those skilled in the art from the following specification and the appended drawing, in which the figure is a diagrammatic representation of a receiving and decoding system according to the present invention.

The invention will be specifically illustrated and described in terms of three-frequency coding transmitted on an RF carrier wave as an audio moduation thereof in which there is transmitted and received a first audio frequency $f_{1 \ldots n}$ very accurately frequency controlled to a few cycles at the transmitter and detected at the receiver by a highly selective resonant reed and having a duration, by way of example, of 1.5 seconds. Subsequent to the first frequency, there are transmitted simultaneously two less accurately controlled audio frequencies $f_A \ldots$, $f_B \ldots$ which are passed through wider band selective circuits for decoding. These wider band selective circuits are designated as group decoder circuits Nos. 1, 2 . . . $n$ and are duplicated for each of the frequencies $f_{1 \ldots n}$. The frequencies $f_A \ldots$, $f_B \ldots$ may be transmitted at the same time as the frequency $f_{1 \ldots n}$ or only subsequently thereto, the requirement for operation being that frequencies $f_A \ldots$, $f_B \ldots$ be transmitted after frequency $f_{1 \ldots n}$ terminates. A practical example is to transmit $f_{1 \ldots n}$ for approximately 1.5 seconds and then frequencies $f_A \ldots$, $f_B \ldots$ simultaneously for approximately 3 seconds.

The first, highly accurate frequency $f_{1 \ldots n}$ is detected by a resonant reed or other highly selective circuit to select the group decoder circuits to which the coding frequencies $f_A \ldots$, $f_B \ldots$ are fed. These simultaneous frequencies are identified at the group decoder circuits and passed to a logic matrix for each group, and the output of the logic matrix is a unique value or other intelligence. Since the group decoder circuits are wide band and lack selectivity, it is desired to prevent the $f_{1 \ldots n}$ frequency from reaching them, since they would otherwise react to the $f_{1 \ldots n}$ frequency because of their lack of selectivity to give a spurious output and inaccurate information. In the decoding system according to the present invention, the $f_{1 \ldots n}$ frequency not only selects the group decoder circuits to which the subsequent frequencies are to be fed, but also inactivates the circuit to prevent its own transmission into the group decoder circuits.

Referring to the drawing, the modulated carrier is received on the antenna 11 feeding an RF receiver 12 whose audio output on line 13 is indicated as the three coding frequencies: $f_{1 \ldots n}$, extremely accurately controlled at the transmitter; and the two subsequently transmitted, less accurately controlled frequencies $f_A \ldots$, $f_B \ldots$. The audio output line 13 is connected to a plurality of highly selected frequency responsive circuits illustrated as resonant reed relays: 14 responsive to frequency $f_1$, 15 responsive to frequency $f_2$, and any number to 16 responsive to frequency $f_n$. The resonant reed relays 14 through 16 have cooperating contacts 17–19, respectively, which engage as their respective reeds vibrate at the frequency to which the relays are responsive. The resonant reed relay contacts 17–19 are connected to a positive source 21 and the relay contacts serve to connect this positive potential to the "select and disable" circuits for the various relays.

Thus, resonant reed relay 14, responsive to frequency $f_1$, connects the positive potential to a line 22 in select and disable circuit No. 1 in the block 23. Line 22 connects through a resistor 24 to the base of a first transistor 25, the base also being shunted to ground through a condenser 26. The emitter of transistor 25 is connected to ground and the collector is connected through the operating coil 27 of a normally open relay 28 having cooperating contacts 29, the circuit to the operating coil 27 being completed to a positive source 31. A holding condenser 32 parallels the operating coil 27 to maintain the relay 28 closed for a predetermined interval after deenergization of the coil.

Line 22 is connected through a resistor 33 to the base of a transistor 34, the base being shunted to ground through a parallel RC combination of a condenser 35 and a resistor 36. The emitter of transistor 34 is connected to ground. The collector of transistor 34 is connected through a load resistor 39 to a positive potential 41 and is coupled by a resistor 37 to the base of a third transistor 38. The audio line 13 is coupled by a line 54 through a resistor 55 and a condenser 56 to the base of transistor 38.

The emitter of transistor 38 is connected through a parallel RC combination of condenser 42 and resistor 43 to ground and the collector is connected through a load resistor 44 to a positive potential at 45. The collector of transistor 38 is coupled through a condenser 46 to the cooperating contacts 29 of relay 28 and thence to a line 47 feeding to group decoder circuits No. 1 in the block 48. The outputs 49 of the group decoder circuits No. 1 are equal in number and unique to the frequencies $f_A \ldots, f_B \ldots$ which are simultaneously transmitted, and these outputs feed into logic matrix No. 1 in the box 51. The logic matrix has unique outputs 52 energizing individual indicators 53.

The resonant reed relay 15, through its contacts 18, connects the audio line 13 to select and disable circuit No. 2 in box 61, and a line 62 connects the audio signal into the select and disable circuit similarly to the connection through line 54 to select and disable circuit No. 1. The output of select and disable circuit No. 2 feeds to group decoder circuits No. 2 in block 63, and their unique frequency outputs 64 feed a logic matrix No. 2 at 65. The unique outputs of logic matrix No. 2 energize indicators 66. Any number of resonant reed relays and select and disable circuits may be provided, depending upon the number of sets of group decoder circuits that are necessary to give all of the intelligence information to be transmitted. This is indicated by the resonant reed relay 16 responsive to $f_n$ whose contacts 19 connect the audio line 13 to a select and disable circuit No. *n* in block 67, a line 68 connecting the audio line to the select and disable circuit similarly to the connections of lines 54 and 62 to select and disable circuits Nos. 1 and 2. The output of select and disable circuit No. *n* feeds to group decoder circuits No. *n* at 69 and the unique frequency outputs 71 are fed to logic matrix No. *n* at 72. The individual unique outputs of the logic matrix are fed to individual indicators 73.

Any number of less accurately controlled frequencies $f_A \ldots, f_B \ldots$ may be employed to set up the group coding, and each set of group decoder circuits will have a like number of wide band selective circuits and a like number of outputs in the sets 49, 64 and 71. The number of frequencies employed will determine the number of indicators available in each set 53, 66 and 73. For example, if 8 frequencies A through H are employed, the resulting combinations of $f_A \ldots, f_B \ldots$ will give 28 unique outputs from each logic matrix and will provide for the actuation of 28 unique indicators in each of the sets 53, 66 and 73. Then, if the accurately controlled frequencies $f_{1 \ldots n}$ are *n* in number, the total number of unique intelligence indications will be 28*n*, or for example, with 10 accurately controlled frequencies $f_{1 \ldots 10}$, there will be 280 unique intelligence indications at 53, 66 and 73.

In describing the operation of the system, it will be assumed that intelligence transmission is by the audio tone frequencies $f_1$; $f_A$, $f_B$ with frequency $f_1$ being transmitted for a period of approximately 1.5 seconds and the two frequencies $f_A$, $f_B$ being transmitted simultaneously thereafter for approximately 3 seconds. Upon the receipt of frequency $f_1$ at the audio output line 13, resonant reed relay 14 vibrates to engage contacts 17 and connect the positive potential source 21 to the line 22. This drives the base of transistor 25 positive so that it conducts through the coil 27 of relay 28, thereby closing contacts 29 to set up the circuit on line 47 to group decoder circuits No. 1 at 48.

However, while resonant reed relay 14 vibrates, the base of transistor 34 is also positive so it also conducts to place the base of transistor 38 near ground potential, thus preventing its conduction. Since the audio path to line 47 is through transistor 38 (by way of line 54, resistor 55, condenser 56, transistor 38, condenser 46, and contacts 29), no audio signal reaches the group decoder circuits while $f_1$ is being received.

The value of condenser 32 is selected so that relay contacts 29 remain closed for at least one second or more after frequency $f_1$ disappears and transistors 25 and 34 cease to conduct. When frequency $f_1$ disappears, the cutoff of transistor 34 is immediate and the base of transistor 38 immediately swings positive so that it conducts while the relay contacts 29 remain closed during the timing period provided by the condenser 32 across the relay coil 27. When $f_1$ disappears, the frequencies $f_A$, $f_B$ are therefore transmitted through line 54, resistor 55, condenser 56, the now-conducting transistor 38, coupling condenser 46, contacts 29 and line 47 to group decoder circuits No. 1 at 48. These frequencies $f_A$ and $f_B$ are selected and identified in the group decoder circuits wide band selective circuits and are passed out on the two outlet lines 49 which are unique to the frequencies A and B. These frequencies are received in logic matrix No. 1 at 51 to identify and energize that single unique output line 52 which is identified by the frequency code A, B. The indicators 53 may represent any intelligence receiving units, a simple example being an indicating light or a pop-out indicator.

Whenever the transmitted intelligence has an initial frequency coding of $f_1$, the group decoder circuits No. 1 at 48 will always receive the coding frequencies $f_A \ldots, f_B \ldots$ and, by selection in the wide band group decoder circuits, will energize the identified frequency lines 49 to feed the logic matrix and secure a unique output at 52. Should a different identifying initial coding frequency be used, such as $f_{2 \ldots n}$, the proper highly selective circuit, illustrated by way of example as resonant reed relays, will be actuated to energize the corresponding coding frequencies of the less accurately controlled values into the proper set of group decoder circuits. It will therefore be apparent that the same less accurately controlled coding frequencies $f_A \ldots, f_B \ldots$ are fed into separate but identical sets of group decoder circuits, the particular set being selected by an initial, very accurate coding frequency which sets up the circuit to the set of group decoder circuits with which the initial accurate frequency is identified. From the description of operation it will be seen that in the select and disable circuits the accurately controlled initial frequency not only selects the particular set group decoder circuits to which the less accurately controlled coding frequencies are to be transmitted, but also disables the audio circuit so that the accurately controlled initial frequency itself cannot be transmitted into the group decoder circuit to give a spurious intelligence communication. When the initial, accurate frequency disappears, the selected circuit remains activated to pass the less accurately controlled, simultaneous coding frequencies into the selected set of group decoder circuits for frequency identification and transmission into the logic matrix to secure a unique intelligence indication.

It will therefore be apparent that the present invention provides accurate and reliable coding and decoding of intelligence information with a multi-frequency code in which only the initial frequency is accurately controlled and identified by a highly selective decoding circuit, while other coding frequencies may be less accurately controlled at the transmitter and passed through wider band decoder circuits at the receiver, thereby materially reducing the cost of a multi-frequency coded transmission system. It is further seen that while the initial, accurately controlled frequency activates the entire sequence, it is prevented from reaching the wide band decoding circuits which might react to this frequency, due to lack of selectivity, and give a spurious intelligence communication.

While it will be understood that the invention is not to be limited to any values of components, one exemplification of a select and disable circuit according to the present invention has utilized the following components and values at $f_1 \ldots {}_n$ frequencies of 150–300 cycles/sec.

| | | |
|---|---|---|
| Voltage source 21, 31, 41, 45 | volts | 15 |
| Transistors 25, 34, 38 | | 2N2711 |
| Resistors: | | |
| 24 | ohms | 2.2K |
| 33 | do | 39K |
| 36 | do | 330K |
| 37 | do | 22K |
| 39 | do | 220K |
| 43 | do | 7.8K |
| 44 | do | 1.2K |
| 55 | do | 10K |
| Condensers: | | |
| 26 | microfarads | 50 |
| 32 | do | 100 |
| 35 | do | 50 |
| 42 | do | 50 |
| 46 | do | 10 |
| 56 | do | 1 |

While certain preferred embodiments of the invention have been specifically illustrated and described, it will be understood the invention is not limited thereto as many variations will be apparent to those skilled in the art and the invention is to be given its broadest interpretation within the terms of the following claims.

We claim:

1. In a system for decoding a coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for interpreting the information coded by said less accurately controlled frequencies; a plurality of high selectivity circuits responsive to different values of said first, accurately controlled frequency; and means controlled by each of said high selectivity circuits for selecting a unique set of group decoder circuits to which said less accurately controlled frequencies are fed.

2. In a system for decoding a coded signal made up of a first, accurately controlled frequency and plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for interpreting the information coded by said less accurately controlled frequencies; a plurality of high selectivity circuits responsive to different values of said first, accurately controlled frequency; and means controlled by said high selectivity circuits for both selecting a unique set of group decoder circuits to which the less accurately controlled frequencies are to be fed and for blocking the transmission of said first frequency to the selected set of group decoder circuits.

3. In a system for decoding a coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for interpreting the information coded by said less accurately controlled frequencies; a plurality of high selectivity circuits responsive to different values of said first, accurately controlled frequency; means controlled by said high selectivity circuits for selecting from the value of said accurately controlled frequency a set of group decoder circuits to receive said less accurately controlled frequencies; means for blocking transmission to the selected set of group decoder circuits while said accurately controlled frequency is present; and means for maintaining the selected set of group decoder circuits active for a time interval after termination of said accurately controlled frequency, during which time interval the less accurately controlled frequencies are fed into the selected set of group decoder circuits.

4. The system defined in claim 3 in which said high selectivity circuits are embodied in resonant reed relays tuned to vibrate at different predetermined frequencies.

5. The system defined in claim 3 including: a relay actuated in response to the presence of an accurately controlled frequency to set up a circuit to a unique set of group decoder circuits; and additional circuit means in series with the contacts of said relay and with the coded frequency circuit, and means for rendering said last-mentioned circuit means non-conductive during the presence of said accurately controlled frequency.

6. In a system for decoding a coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for interpretating the information coded by said less accurately controlled frequencies; a resonant reed selective circuit for each set of group decoder circuits and each tuned to a different value of said first, accurately controlled frequency; a pair of transistors fed from the output of each resonant reed circuit upon vibration thereof at its tuned frequency; a relay for each reed circuit energized by conduction of one of said pair of transistors and having contacts controlled thereby for closing a circuit through the associated set of group decoder circuits; a third transistor in series with said relay contacts and with the coded frequency circuit; and means responsive to conduction of the other of said pair of transistors for rendering said third transistor non-conductive to prevent passage of coding frequencies to the set of group decoder circuits while the accurately controlled frequency is present.

7. In a system for decoding a coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for interpreting the information coded by said less accurately controlled frequencies; a resonant reed selective circuit for each set of group decoder circuits and each tuned to a different value of said first, accurately controlled frequency; a pair of transistors fed from the output of each resonant reed circuit upon vibration thereof at its tuned frequency; a relay for each reed circuit energized by conduction of one of said pair of transistors and having contacts controlled thereby for closing a circuit through the associated set of group decoder circuits; a third transistor in series with said relay contacts and with the coded frequency circuit; means responsive to conduction of the other of said pair of transistors for rendering said third transistor non-conductive to prevent passage of coding frequencies to the set of group decoder circuits while the accurately controlled frequency is present; and time delay means for delaying the opening of the relay contacts for a predetermined interval after disappearance of said accurately controlled frequency to provide for passage of the less accurately controlled frequencies to the selected set of group decoder circuits through the now-conducting third transistor and the relay contacts.

8. In a system for decoding a frequency coded signal made up of a first, accurately controlled frequency and a plurality of subsequent and simultaneous less accurately controlled frequencies; a plurality of sets of group decoded circuits of relatively wide band selectivity to which said less accurately controlled frequencies are fed and in which they are identified; means associated with each set of group decoder circuits for giving a unique interpretation of the information coded by said less accurately controlled frequencies; a selection circuit for each set of group decoder circuits; and a high selectivity circuit for each selection circuit responsive to a unique value of said accurately controlled frequency to select the set of group decoder circuits to which the less accurately controlled coding frequencies are transmitted.

9. In a system for decoding a frequency coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for giving a unique interpretation of the information coded by said less accurately controlled frequencies; a selection circuit for each set of group decoder circuits; a high selectivity circuit for each selection circuit responsive to a unique value of said accurately controlled frequency to select the set of group decoder circuits to which the less accurately controlled coding frequencies are transmitted; and means for blocking transmission to the selected set of group decoder circuits while said accurately controlled frequency is present.

10. In a system for decoding a frequency coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for giving a unique interpretation of the information coded by said less accurately controlled frequencies; a high selectivity circuit for each set of group decoder circuits and each responsive to a unique value of said accurately controlled frequency; means controlled by each high selectivity circuit for activating a selected set of group decoder circuits in response to the transmission of a particular value of said accurately controlled frequency; and means for blocking transmission of the less accurately controlled coding frequencies to the activated set of group decoder circuits while said accurately controlled frequency is present.

11. In a system for decoding a frequency coded signal made up of a first, accurately controlled frequency and a plurality of subsequent and simultaneous less accurately controlled frequencies; a plurality of sets of group decoder circuits of relatively wide band selectivity to which said less accurately controlled frequencies are fed and in which they are identified; means associated with each set of group decoder circuits for giving a unique interpretation of the information coded by said less accurately controlled frequencies; a high selectivity circuit for each set of group decoder circuits and each responsive to a unique value of said accurately controlled frequency; means controlled by each high selectivity circuit for activating a selected set of group decoder circuits in response to the transmission of a particular value of said accurately controlled frequency; means for blocking transmission of the coding frequencies to the activated set of group decoder circuits while said accurately controlled frequency is present; and means for maintaining the activation of a selected set of group decoder circuits for a predetermined time interval after disappearance of said accurately controlled frequency for transmission of said less accurately controlled frequencies into said activated set of group decoder circuits.

12. The system defined in claim 11 in which said transmission prevention means is a transistor in series with the set of group decoder circuits which is driven to cutoff by said high selectivity circuit during the presence of said accurately controlled frequency.

References Cited

UNITED STATES PATENTS

| | | | |
|---|---|---|---|
| 2,626,384 | 1/1953 | Winkler | 340—156 |
| 3,039,081 | 6/1962 | Smith | 340—156 XR |
| 3,060,408 | 10/1962 | Stewart | 340—171 |

JOHN W. CALDWELL, *Primary Examiner.*

DONALD J. YUSKO, *Assistant Examiner.*